US012595571B2

(12) United States Patent
Inagaki et al.

(10) Patent No.: US 12,595,571 B2
(45) Date of Patent: Apr. 7, 2026

(54) ELECTROLYTIC LIQUID GENERATION DEVICE

(71) Applicant: Panasonic Intellectual Property Management Co., Ltd., Osaka (JP)

(72) Inventors: Kenichiro Inagaki, Shiga (JP); Osamu Imahori, Shiga (JP); Tomohiro Yamaguchi, Shiga (JP); Shunsuke Mori, Osaka (JP); Minoru Nagata, Shiga (JP); Mami Kuroda, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 528 days.

(21) Appl. No.: 17/795,186

(22) PCT Filed: Nov. 10, 2020

(86) PCT No.: PCT/JP2020/041831
§ 371 (c)(1),
(2) Date: Jul. 25, 2022

(87) PCT Pub. No.: WO2021/161598
PCT Pub. Date: Aug. 19, 2021

(65) Prior Publication Data
US 2023/0087827 A1 Mar. 23, 2023

(30) Foreign Application Priority Data
Feb. 14, 2020 (JP) ................................. 2020-023376

(51) Int. Cl.
*C25B 1/13* (2006.01)
*C02F 1/461* (2023.01)
(Continued)

(52) U.S. Cl.
CPC ............ *C25B 1/13* (2013.01); *C02F 1/46104* (2013.01); *C02F 1/4672* (2013.01); *C25B 9/13* (2021.01);
(Continued)

(58) Field of Classification Search
CPC ................ C25B 1/13; C25B 9/13; C25B 9/23
See application file for complete search history.

(56) References Cited

U.S. PATENT DOCUMENTS

| | | | |
|---|---|---|---|
| 8,323,461 B2 * | 12/2012 | Scarsbrook | ............... C25B 9/23 204/263 |
| 2016/0002798 A1 * | 1/2016 | Rømer | ...................... C25B 1/04 204/263 |

(Continued)

FOREIGN PATENT DOCUMENTS

| | | |
|---|---|---|
| CN | 108883951 A | 11/2018 |
| JP | 2017-176993 A | 10/2017 |

(Continued)

OTHER PUBLICATIONS

International Search Report issued on Jan. 12, 2021 in International Application No. PCT/JP2020/041831, with English translation.
(Continued)

*Primary Examiner* — Luan V Van
*Assistant Examiner* — Alexander R. Parent
(74) *Attorney, Agent, or Firm* — Rimon P.C.

(57) ABSTRACT

An electrolytic liquid generation device includes a stacked body in which a conductive membrane is stacked and interposed between a cathode and an anode adjacent to each other, an electrolytic part that electrolyzes a liquid, and a housing in which the electrolytic part is disposed and a flow path is formed. The electrolytic part includes a slot that is open in the flow path, and in the slot, a part of an interface between the conductive membrane and the cathode and the (Continued)

anode is exposed. Either one of the electrodes of the cathode and the anode has an outer periphery smaller in width than the slot of the electrolytic part. This can provide an electrolytic liquid generation device capable of improving the concentration of an electrolytic product dissolved in the liquid.

11 Claims, 4 Drawing Sheets

(51) Int. Cl.

| | |
|---|---|
| *C02F 1/467* | (2023.01) |
| *C25B 9/13* | (2021.01) |
| *C25B 9/23* | (2021.01) |
| *C25B 9/63* | (2021.01) |
| *C25B 11/02* | (2021.01) |

(52) U.S. Cl.
CPC .................. *C25B 9/23* (2021.01); *C25B 9/63* (2021.01); *C25B 11/02* (2013.01); *C02F 2001/46147* (2013.01); *C02F 2001/46157* (2013.01); *C02F 2201/46115* (2013.01); *C02F 2201/782* (2013.01)

(56) References Cited

U.S. PATENT DOCUMENTS

| | | | |
|---|---|---|---|
| 2017/0174539 A1* | 6/2017 | Inagaki | ................. C02F 1/4672 |
| 2019/0055144 A1 | 2/2019 | Inagaki et al. | |
| 2020/0017984 A1 | 1/2020 | Inagaki et al. | |

FOREIGN PATENT DOCUMENTS

| | | | |
|---|---|---|---|
| JP | 2018-012105 A | 1/2018 |
| JP | 2020-011180 A | 1/2020 |
| TW | 201617484 A | 5/2016 |
| WO | 2014/141587 A1 | 9/2014 |

OTHER PUBLICATIONS

English Translation of TW Search Report dated Feb. 22, 2024 for the related TW Patent Application No. 109139966.
English Translation of Chinese Search Report dated Jul. 12, 2023 for the related Chinese Patent Application No. 202080095791.4.
The Indian OA dated Mar. 10, 2025 for the related Indian Patent Application No. 202247043892.

* cited by examiner

FIG. 1

ELECTROLYTIC LIQUID GENERATION DEVICE

CROSS-REFERENCE OF RELATED APPLICATIONS

This application is the U.S. National Phase under 35 U.S.C. § 371 of International Patent Application No. PCT/JP2020/041831, filed on Nov. 10, 2020, which in turn claims the benefit of Japanese Patent Application No. 2020-023376, filed on Feb. 14, 2020, the entire disclosures of which Applications are incorporated by reference herein.

TECHNICAL FIELD

The present disclosure relates to an electrolytic liquid generation device.

BACKGROUND ART

A conventionally known electrolytic liquid generation device includes an electrolytic part in which an anode, a conductive membrane, and a cathode are stacked, the electrolytic part generating ozone (electrolytic product) to provide ozone water (electrolytic liquid) (see, for example, PTL 1).

The electrolytic part described in PTL 1 has a slot in which a hole formed in the cathode as an electrode and a hole formed in the conductive membrane communicate with each other. By applying a voltage to the electrolytic part, water introduced into the slot is electrolyzed and ozone is generated.

In the above-described conventional technique, the ozone generated in the vicinity of the interface between the conductive membrane and the anode is dissolved in water while being carried to the downstream side of a flow path along the flow of water (liquid). Then, dissolved ozone water (ozone water: electrolytic liquid) is generated by dissolving ozone in water.

In the above-described conventional technique, the width of the outer periphery of the anode (electrode) is larger than the width of the slot of the cathode (electrode). Ozone carried to the downstream side in the water flowing direction (liquid flowing direction) is thus blocked by the outer periphery of the anode. Then, large bubbles of ozone blocked at the outer periphery of the anode grow. This may cause ozone to float in water without dissolving in water even when ozone is separated from the interface of the electrode. As a result, the concentration of ozone dissolved in water may decrease.

CITATION LIST

Patent Literature

PTL 1: Unexamined Japanese Patent Publication No. 2017-176993

SUMMARY OF THE INVENTION

The present disclosure provides an electrolytic liquid generation device capable of improving the concentration of an electrolytic product dissolved in liquid.

An electrolytic liquid generation device according to an aspect of the present disclosure includes a stacked body in which a conductive membrane is stacked and interposed between a cathode and an anode constituting electrodes adjacent to each other, an electrolytic part that electrolyzes liquid, and a housing in which the electrolytic part is disposed. The housing includes an inlet port into which a liquid to be supplied to the electrolytic part flows, an outlet port from which an electrolytic liquid generated in the electrolytic part flows out, and a flow path in which a liquid flowing direction intersects a stacking direction of the stacked body. The electrolytic part includes a slot that is open in the flow path and formed in such a manner that at least a part of interfaces between the conductive membrane and the respective electrodes is exposed. Either one of the electrodes of the cathode and the anode has an outer periphery smaller in width than the slot of the electrolytic part.

According to the present disclosure, it is possible to provide an electrolytic liquid generation device capable of improving the concentration of an electrolytic product dissolved in liquid.

BRIEF DESCRIPTION OF THE DRAWINGS

FIG. 1 is an exploded perspective view illustrating an ozone water generator according to an exemplary embodiment.

DESCRIPTION OF EMBODIMENT

An exemplary embodiment is described below in detail with reference to the drawings. Unnecessarily detailed description may be omitted. For example, a detailed description of already well-known matters or a redundant description of substantially the same configuration may be omitted.

Note that, the accompanying drawings and the following description are only presented to help those skilled in the art fully understand the present disclosure and are not intended to limit the subject matters as claimed in the claims.

Hereinafter, an ozone water generator is described as an example of the electrolytic liquid generation device. The ozone water generator generates ozone (electrolytic product) and dissolves the ozone in water (liquid) to generate ozone water (electrolyzed water: electrolytic liquid). Ozone water has advantages of not being persistent and not producing by-products and is effective for sterilization or decomposition of organic substances. Ozone water is thus widely used in water treatment, food, and medical fields.

In the following description, an extending direction of a flow path is referred to as liquid flowing direction (direction in which liquid flows) X, a width direction of the flow path is referred to as width direction (direction crossing the liquid flowing direction) Y, and a direction in which an electrode and a conductive membrane are stacked is referred to as stacking direction Z. In the present exemplary embodiment, stacking direction Z is a vertical direction in a state where an electrode case lid of the electrolytic liquid generation device is disposed on the upper side.

Hereinafter, ozone water generator 10 (electrolytic liquid generation device) according to the present exemplary embodiment will be described with reference to FIGS. 1 to 4 with items.

[1. Configuration]

First, a configuration of ozone water generator 10 according to the present exemplary embodiment will be described with reference to FIGS. 1 to 3.

Figure 1:
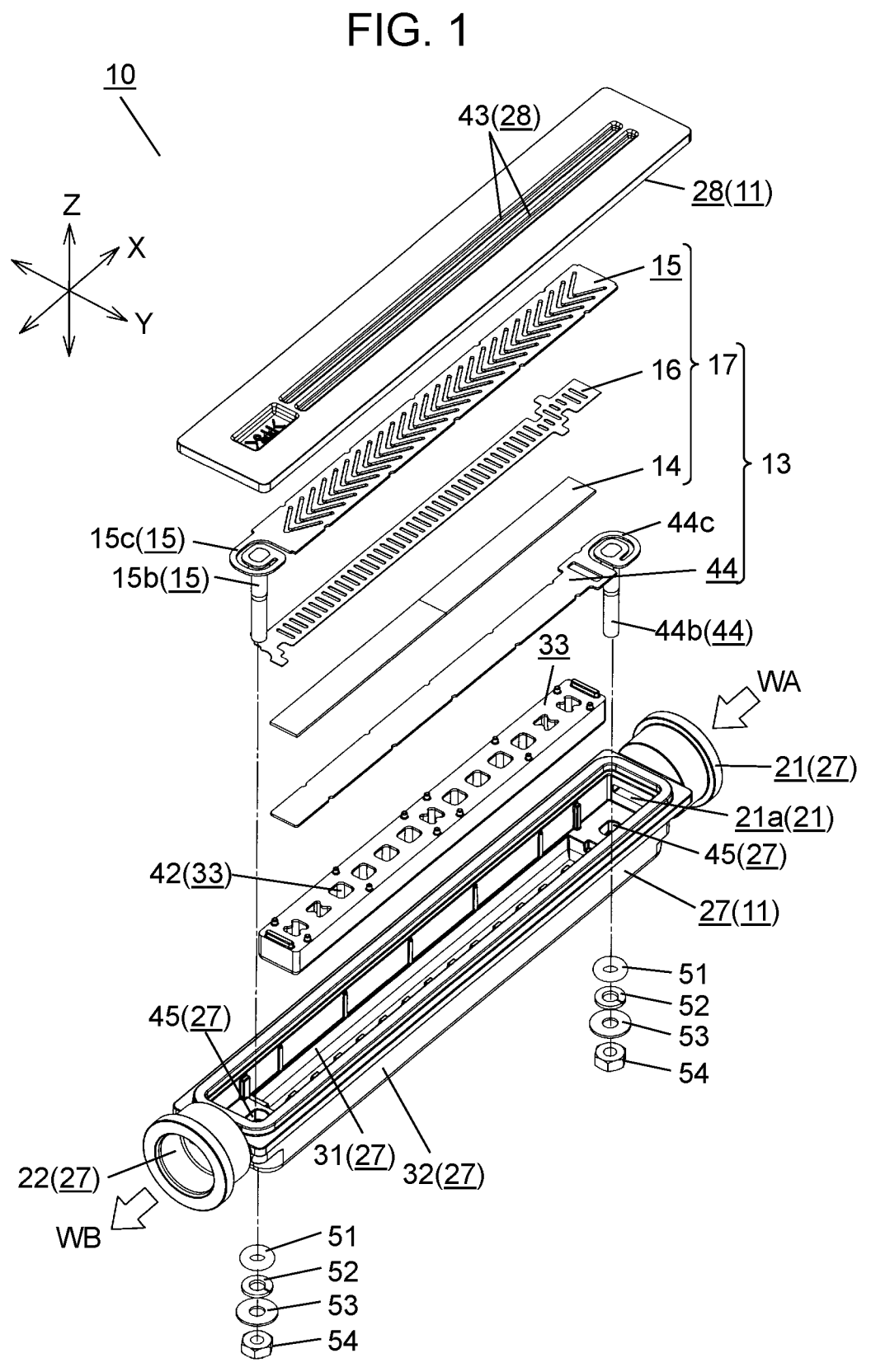
Figure 2:
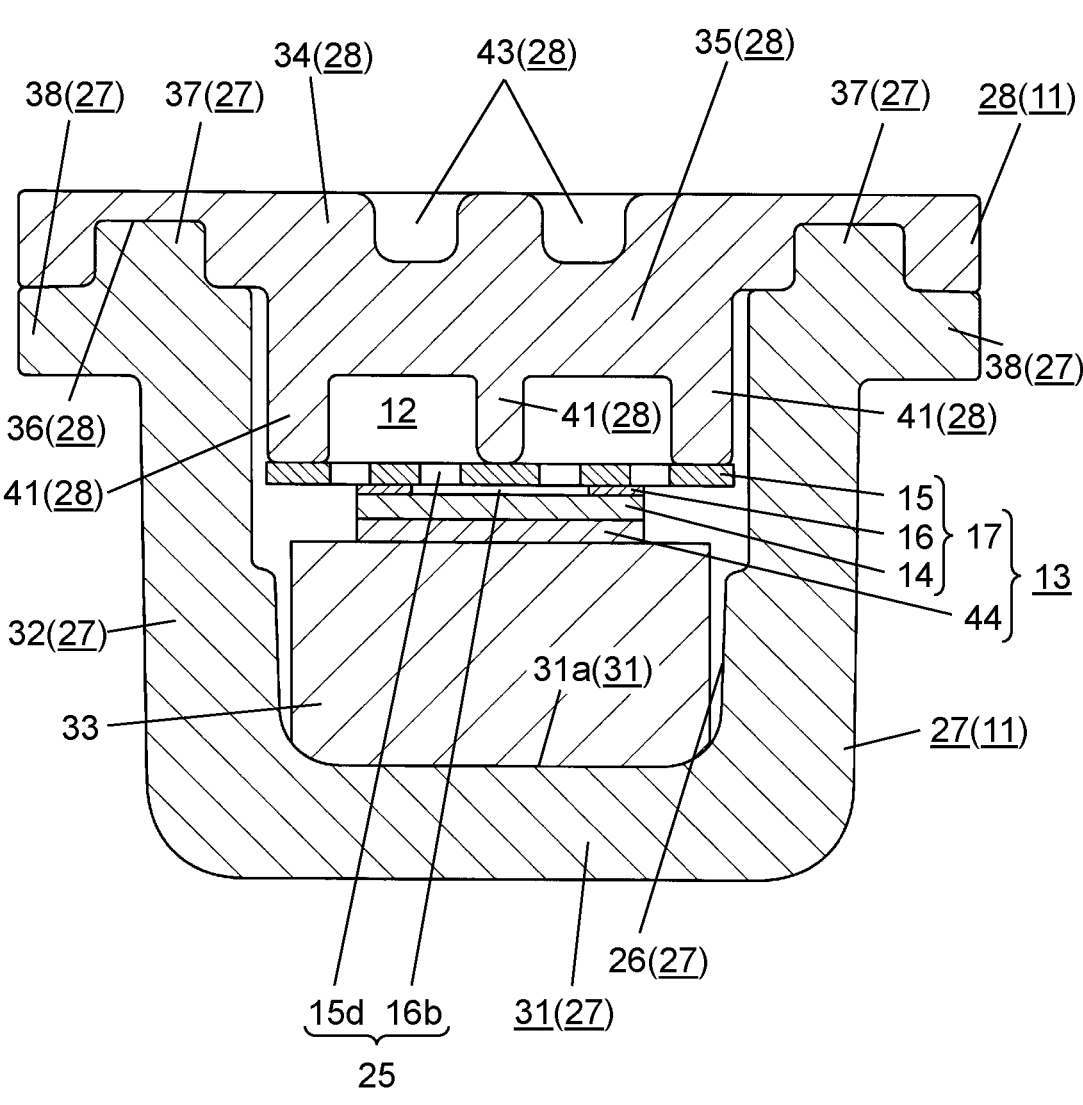
FIG. 2 is a sectional view of the ozone water generator according to the exemplary embodiment taken along a plane orthogonal to a liquid flowing direction.

As illustrated in FIGS. 1 and 2, ozone water generator 10 of the present exemplary embodiment includes housing 11. Housing 11 includes flow path 12 formed inside.

Housing 11 accommodates electrolytic part 13 inside. Electrolytic part 13 is disposed to face flow path 12. Electrolytic part 13 electrolyzes water flowing through flow path 12.

Figure 3:
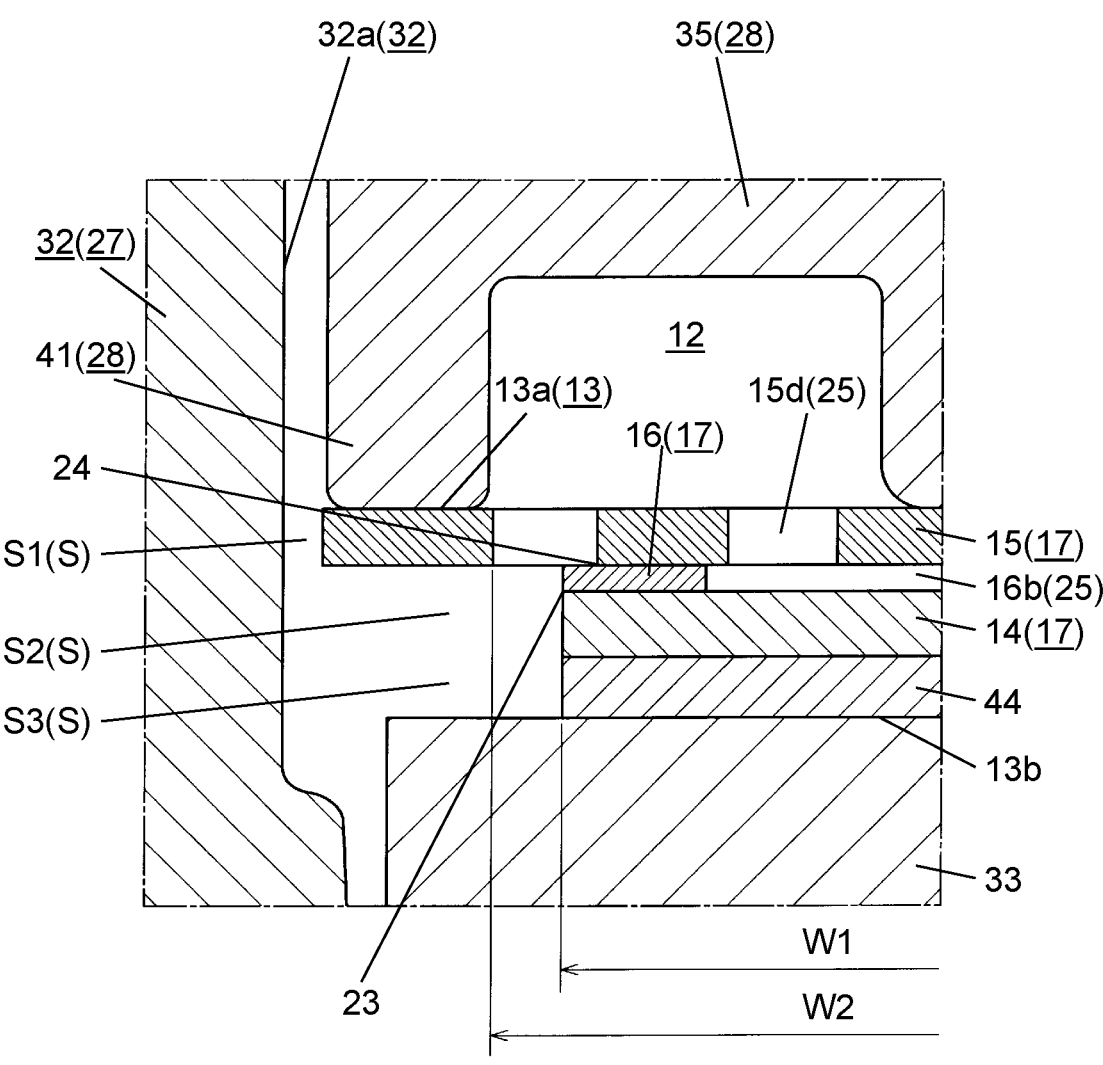
FIG. 3 is an enlarged sectional view illustrating a portion of an electrolytic part according to the exemplary embodiment where a slot is formed.

As illustrated in FIG. 3, in the present exemplary embodiment, electrolytic part 13 is disposed in housing 11 such that upper surface 13*a* (surface on one side in stacking direction Z) of electrolytic part 13 faces flow path 12.

Electrolytic part 13 includes stacked body 17. Stacked body 17 is configured by stacking anode 14 and cathode 15 constituting adjacent electrodes, and conductive membrane 16 interposed between anode 14 and cathode 15.

Flow path 12 formed in housing 11 includes inlet port 21 into which liquid WA such as water to be supplied to electrolytic part 13 flows and outlet port 22 from which ozone water WB generated in electrolytic part 13 flows out (see FIG. 1). Flow path 12 formed in housing 11 is in a direction in which liquid flowing direction X intersects stacking direction Z of stacked body 17.

Stacked body 17 includes a plurality of slots 25 that are open in flow path 12 and are formed in such a manner that at least a part of interface 23 between conductive membrane 16 and anode 14 and interface 24 between conductive membrane 16 and cathode 15 (see FIG. 3) is exposed. It is sufficient that at least one slot 25 is formed in stacked body 17.

That is, in ozone water generator 10 of the present exemplary embodiment, slot 25 is formed in stacked body 17. This configuration allows water supplied from inlet port 21 of housing 11 into flow path 12 to be introduced into slot 25. Then, electrolytic treatment that causes an electrochemical reaction is mainly performed on the water introduced into slot 25. As a result, ozone water in which ozone as an electrolytic product is dissolved is generated.

Housing 11 is formed using, for example, a non-conductive resin such as PPS.

In the present exemplary embodiment, housing 11 includes electrode case 27 that is open upward, the electrode case including recess 26 that accommodates electrolytic part 13, electrode case lid 28 that covers the opening of electrode case 27 from above, and the like.

As illustrated in FIG. 1, electrode case 27 includes a bottom wall 31 and a peripheral wall 32 connected to the peripheral edge of the bottom wall 31. Electrode case 27 is formed in a substantially box shape (including a box shape) that is open upward. That is, electrode case 27 has recess 26 defined by inner surface 31*a* of bottom wall 31 and inner surface 32*a* of peripheral wall 32. Recess 26 is open upward.

Electrolytic part 13 is introduced into recess 26 from the open side (upper side) of recess 26 of electrode case 27. Electrolytic part 13 is thus accommodated in recess 26 of electrode case 27. At this time, the opening of recess 26 is formed to be larger than the outline shape of electrolytic part 13 in a plan view viewed along stacking direction Z. Electrolytic part 13 can be thus inserted into recess 26 with stacking direction Z being coincident with the vertical direction.

Further, in the present exemplary embodiment, electrolytic part 13 is accommodated in recess 26 with elastic body 33 interposed therebetween. Specifically, electrolytic part 13 is accommodated in recess 26 with elastic body 33 being interposed between electrolytic part 13 and electrode case 27 and being in contact with lower surface 13*b* (surface on the other side in stacking direction Z) of electrolytic part 13. Elastic body 33 is formed using a material having elasticity, such as rubber, plastic, or a metal spring.

In the present exemplary embodiment, when electrode case lid 28 is attached to electrode case 27 to constitute housing 11, flow path 12 is formed between electrolytic part 13 and electrode case lid 28. At this time, it is preferable to form flow path 12 such that sectional areas (areas of flow path 12 when cut along a plane orthogonal to liquid flowing direction X) at a portion faced by electrolytic part 13 are substantially the same (including the same).

Electrode case lid 28 includes lid body 34 having a substantially rectangular (including rectangular) plate-like shape, protrusion 35, and the like. Protrusion 35 protrudes downward from the lower center of lid body 34 and is formed to be insertable into recess 26 of electrode case 27.

In addition, protrusion 35 of lid body 34 has fitting recess 36 for welding formed around the entire circumference of the peripheral edge. When electrode case lid 28 is attached to electrode case 27, fitting protrusion 37 for welding formed around the entire circumference of the opening of electrode case 27 is inserted into fitting recess 36 (see FIG. 2).

In the present exemplary embodiment, electrode case 27 has flange 38 that is formed around the entire circumference of the upper end of peripheral wall 32 and extends substantially horizontally (including horizontally) outward. Fitting protrusion 37 protruding upward is formed on flange 38 to surround the opening of electrode case 27. Protrusion 35 of electrode case lid 28 is inserted into recess 26 of electrode case 27, and fitting protrusion 37 is inserted into fitting recess 36. In this state, electrode case lid 28 and electrode case 27 are welded, whereby housing 11 is formed.

In addition to the welding, electrode case lid 28 may be attached to electrode case 27 by screwing electrode case lid 28 to electrode case 27 with a sealing material interposed between electrode case lid 28 and electrode case 27.

Protrusion 35 of lid body 34 of electrode case lid 28 includes projections 41 formed at both ends and a center in width direction Y on the lower surface side, the projections pressing electrolytic part 13 downward. Electrolytic part 13 is accommodated in recess 26 with elastic body 33 interposed therebetween, and electrode case lid 28 is attached to electrode case 27. This causes projections 41 formed on electrode case lid 28 to press electrolytic part 13 downward.

That is, in the present exemplary embodiment, projections 41 of electrode case lid 28 press electrolytic part 13 downward. This causes elastic body 33 to apply a constant pressure to entire electrolytic part 13. As a result, adhesion of each member constituting electrolytic part 13 can be further enhanced by the pressing.

In the present exemplary embodiment, elastic body 33 has a plurality of through-bores 42 penetrating in stacking direction Z and formed along the longitudinal direction (liquid flowing direction X). This configuration causes elastic body 33 to deform to the inner surface side of through-bore 42 too when elastic body 33 is pressed by electrolytic part 13. As a result, the compression of electrode case 27 by elastic body 33 pressed by the electrolytic part 13 is inhibited.

In the present exemplary embodiment, lid body 34 has groove 43 formed on the upper surface. Groove 43 can be used for, for example, positioning, catching, reverse insertion prevention, and the like when ozone water generator 10 is fixed. This enables an easier incorporation of ozone water generator 10 into a device that needs ozone generation.

That is, ozone water generator 10 can be used in a state of being incorporated in another device or equipment. When ozone water generator 10 is incorporated into another device or equipment, it is preferable to dispose ozone water generator 10 in a standing state so that inlet port 21 faces downward and outlet port 22 faces upward. With ozone water generator 10 disposed as described above, the ozone generated at an electrode interface can quickly separate from the electrode interface with buoyancy. That is, the ozone generated at the electrode interface can quickly separate from the electrode interface before bubble growth occurs. This makes the ozone easily dissolve in water and improves generation efficiency of ozone water. The disposition state of ozone water generator 10 is not limited to the above disposition. For example, any disposition is possible as long as the generated ozone can separate from the electrode interface.

Next, a specific configuration of electrolytic part 13 will be described with reference to FIGS. 1 to 3.

As illustrated in FIG. 1, electrolytic part 13 is formed in a substantially rectangular shape (including a rectangular shape) in which liquid flowing direction X matches to the longitudinal direction in a plan view (a state viewed from stacking direction Z). Electrolytic part 13 includes stacked body 17 formed by stacking anode 14, conductive membrane 16, and cathode 15 in this order from the bottom. At this time, in the present exemplary embodiment, in stacked body 17, conductive membrane 16 is stacked and interposed between anode 14 and cathode 15 constituting electrodes adjacent to each other.

Power feeder 44 is stacked under anode 14 of stacked body 17. Then, for example, electricity supplied from an external power supply (not illustrated) is supplied to anode 14 through power feeder 44.

In the present exemplary embodiment, each of power feeder 44, anode 14, conductive membrane 16, and cathode 15 has a rectangular planar shape with liquid flowing direction X as a longitudinal direction and width direction Y as a lateral direction, and is formed in a flat plate shape having a thickness in stacking direction Z. Anode 14 and cathode 15 may have a membrane shape, a network shape, or a linear shape.

Power feeder 44 is formed using, for example, titanium, and is in contact with anode 14 on the surface opposite to conductive membrane 16. Further, in power feeder 44, at one end in the longitudinal direction (upstream side in liquid flowing direction X), power feeding shaft 44b for anode is electrically connected via spiral spring 44c. Power feeding shaft 44b is inserted into through-hole 45 formed on one end side in liquid flowing direction X of bottom wall 31 of electrode case 27. A part of power feeding shaft 44b protruding outside electrode case 27 is electrically connected to a positive electrode of a power supply (not illustrated).

Anode 14 is formed by, for example, forming a conductive diamond membrane on a conductive substrate formed using silicon and having a length of about 100 mm. In the present exemplary embodiment, anode 14 is formed by arranging two conductive substrates each having a length of about 50 mm (see FIG. 1). The conductive diamond membrane is boron-doped and thus has conductivity. Then, the conductive diamond membrane is formed on the conductive substrate with a membrane thickness of about 3 μm by, for example, a plasma CVD method.

Conductive membrane 16 is disposed on anode 14 on which the conductive diamond membrane is formed. Conductive membrane 16 is composed of a proton conductivity type ion exchange film and has a thickness of about 100 μm to 200 μm. Conductive membrane 16 has a plurality of conductive membrane holes 16b (conductive membrane slots) formed to penetrate in the thickness direction (stacking direction Z).

In the present exemplary embodiment, the plurality of conductive membrane holes 16b have substantially the same (including the same) shape. Specifically, each of conductive membrane holes 16b is formed in, for example, an elongated hole shape in a direction (width direction Y) orthogonal to liquid flowing direction X. The plurality of conductive membrane holes 16b are aligned in one line at a predetermined pitch along the longitudinal direction (liquid flowing direction X).

The shape and alignment of conductive membrane holes 16b are not limited to the above form and may have another form. For example, conductive membrane hole 16b may be formed in an elongated hole shape in liquid flowing direction X. Further, conductive membrane hole 16b may be formed in an elongated hole shape in a direction intersecting liquid flowing direction X. Conductive membrane hole 16b may be formed in, for example, a V shape having a bent part in plan view viewed from stacking direction Z. Further, it is sufficient that at least one conductive membrane hole 16b is formed.

Cathode 15 is disposed on conductive membrane 16. Cathode 15 is formed of, for example, a titanium electrode plate having a thickness of about 0.5 mm. In cathode 15, at the other end in the longitudinal direction (downstream side in the liquid flowing direction X), power feeding shaft 15b for cathode is electrically connected via spiral spring 15c. Power feeding shaft 15b is inserted into through-hole 45 formed on the other end side in liquid flowing direction X of bottom wall 31. A part of power feeding shaft 15b protruding outside electrode case 27 is electrically connected to a negative electrode of the power supply (not illustrated).

Cathode 15 has a plurality of cathode holes 15d (cathode slot or electrode slot) penetrating in the thickness direction.

Figure 4:
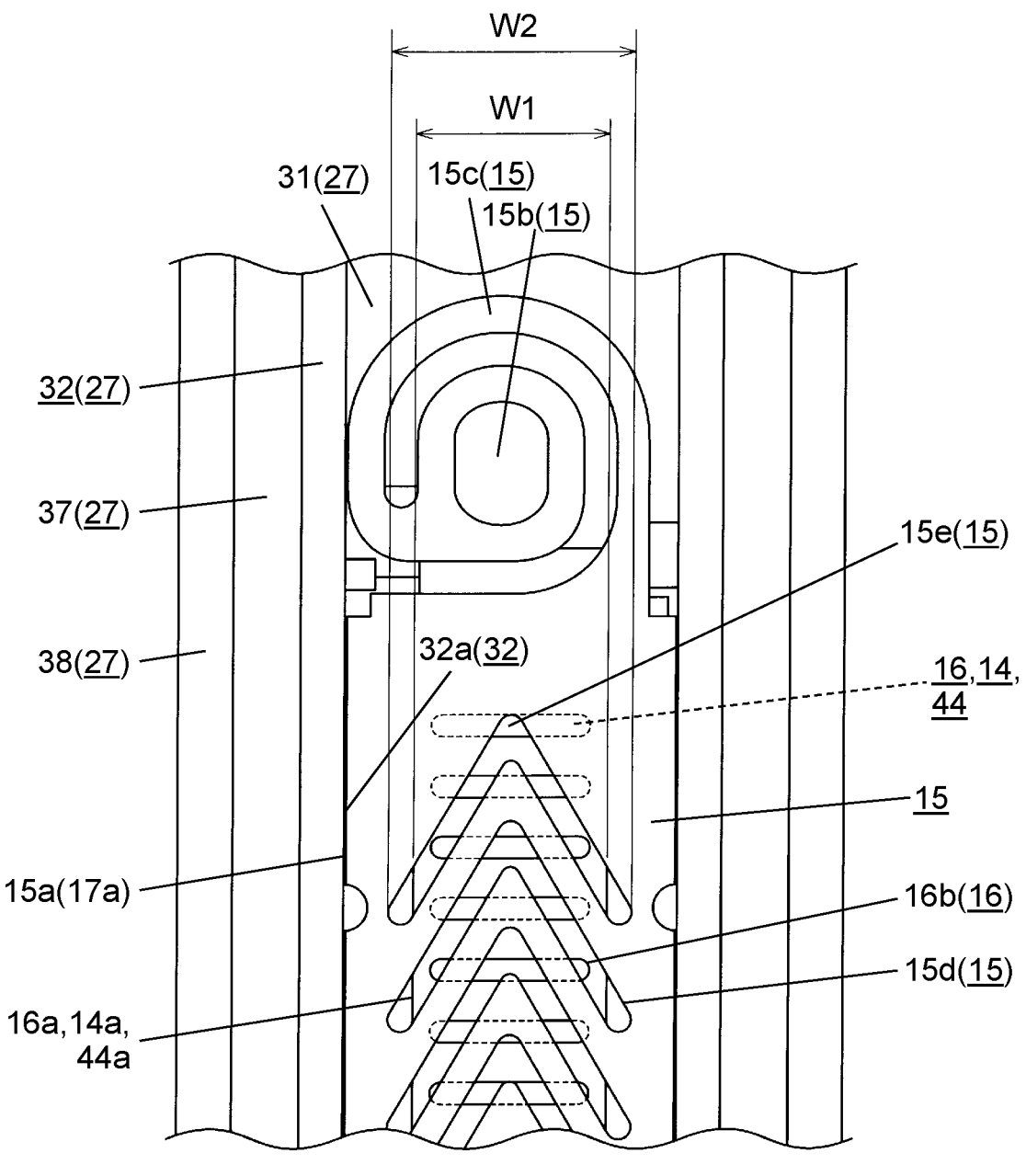
FIG. 4 is a partially enlarged plan view illustrating a state in which a cathode according to the exemplary embodiment is stacked on a conductive membrane.

In the present exemplary embodiment, the plurality of cathode holes 15d have substantially the same (including the same) shape. Specifically, as illustrated in FIG. 4, each cathode hole 15d is formed in, for example, a V shape in which bent part 15e is disposed on the downstream side in plan view viewed from stacking direction Z. The plurality of cathode holes 15d are aligned in one line at a predetermined pitch along the longitudinal direction (liquid flowing direction X).

The pitch of cathode holes 15d may be the same as the pitch of conductive membrane holes 16b or different from the pitch of conductive membrane holes 16b. The shape and alignment of cathode holes 15d are not limited to the above form and may have another form. For example, cathode hole 15d may be formed in an elongated hole shape in liquid flowing direction X. Cathode hole 15d may be formed in an elongated hole shape in a direction intersecting liquid flowing direction X. Cathode hole 15d may be formed in an elongated hole shape in a direction (width direction Y) orthogonal to liquid flowing direction X. Further, it is sufficient that at least one cathode hole 15d is formed.

That is, in the present exemplary embodiment, as illustrated in FIG. 4, conductive membrane holes 16b and cathode holes 15d are configured to have different shapes (outline shapes and sizes) in plan view (as viewed along stacking direction Z of stacked body 17). This configuration can inhibit the contact area between conductive membrane 16 and cathode 15 (electrode) from changing even when conductive membrane 16 is displaced relative to cathode 15 (electrode) in the direction intersecting stacking direction Z. Conductive membrane hole 16*b* and cathode hole 15*d* may also have the same shape (outline shape and size) in plan view.

In the present exemplary embodiment, when conductive membrane 16 and cathode 15 are stacked, at least some of the holes (cathode hole 15*d* and conductive membrane hole 16*b*) need to communicate with each other. Further, the electrical contact area between conductive membrane 16 and cathode 15 needs to be sufficiently secured. That is, as long as the above conditions are satisfied, conductive membrane 16 and cathode 15 may have the same or different projection dimensions (sizes in plan view).

In the present exemplary embodiment, the dimension of cathode 15 in width direction Y is larger than the dimension of conductive membrane 16, anode 14, and power feeder 44 in width direction Y. That is, the projection dimension of cathode 15 is larger than the projection dimension of conductive membrane 16, anode 14, and power feeder 44.

The dimension in width direction Y and the projection dimension of anode 14 may be the same as or different from the dimension in width direction Y and the projection dimension of conductive membrane 16 and power feeder 44. However, the dimension in width direction Y and the projection dimension of anode 14 preferably have a shape that can completely close conductive membrane holes 16*b* from below when conductive membrane 16 is stacked on anode 14. This configuration can further downsize conductive membrane 16 of high cost.

In addition, it is preferable that power feeder 44 have a dimension in width direction Y and a projection dimension with which electricity can be efficiently supplied to anode 14. It is preferable that elastic body 33 have a dimension in width direction Y and a projection dimension with which the entire lower surface of power feeder 44 (lower surface 13*b* of electrolytic part 13) can be pressed.

Thus, in the present exemplary embodiment, anode 14, conductive membrane 16, and power feeder 44 are formed to have substantially the same (including the same) dimension in width direction Y. That is, as illustrated in FIG. 3, anode 14, conductive membrane 16, and power feeder 44 are formed to have substantially the same (including the same) projection dimension and substantially the same (including the same) dimension in width direction Y.

Further, in the present exemplary embodiment, as illustrated in FIG. 4, anode 14, conductive membrane 16, and power feeder 44 are formed such that a dimension in width direction Y (width W1 in a direction crossing liquid flowing direction X) is smaller than a dimension in width direction Y (width W2 in a direction crossing liquid flowing direction X) of cathode hole 15*d* (see FIGS. 3 and 4).

Electrolytic part 13 configured as described above can be easily accommodated in recess 26 of electrode case 27 by, for example, a method described below.

First, elastic body 33 is inserted into recess 26 of electrode case 27. Thereafter, power feeder 44 is inserted into recess 26 of electrode case 27. Then, power feeder 44 is disposed on elastic body 33 inserted into recess 26 of electrode case 27. Specifically, power feeder 44 is inserted into recess 26 of electrode case 27 with the tip of power feeding shaft 44*b* of power feeder 44 facing downward. At the same time, power feeding shaft 44*b* of power feeder 44 is inserted into one through-hole 45 of electrode case 27. Power feeder 44 is thus stacked on elastic body 33.

Next, anode 14 is inserted into recess 26 of electrode case 27, and anode 14 is stacked on power feeder 44.

Next, conductive membrane 16 is inserted into recess 26 of electrode case 27, and conductive membrane 16 is stacked on anode 14.

Next, cathode 15 is inserted into recess 26 of electrode case 27 with the tip of power feeding shaft 15*b* of cathode 15 facing downward. At the same time, power feeding shaft 15*b* of cathode 15 is inserted into the other through-hole 45 of electrode case 27. Cathode 15 is thus stacked on conductive membrane 16.

Next, O-ring 51, washer 52, washer 53, and hex nut 54 are inserted into a portion of power feeding shaft 44*b* for anode protruding outside from electrode case 27 and a portion of power feeding shaft 15*b* for cathode protruding outside from electrode case 27, respectively. In the inserted state, they are tightened with hex nut 54. Electrolytic part 13 is thus accommodated and fixed in recess 26 while being pressed against elastic body 33.

Further, in the present exemplary embodiment, electrode case lid 28 is relatively moved in stacking direction Z with respect to electrode case 27 accommodating electrolytic part 13. Protrusion 35 of electrode case lid 28 is thus inserted into recess 26 of electrode case 27. Further, fitting protrusion 37 of electrode case 27 is inserted into fitting recess 36 for welding of electrode case lid 28.

That is, ozone water generator 10 according to the present exemplary embodiment can be easily assembled only by relatively moving the respective members described above in the vertical direction (stacking direction Z) with respect to electrode case 27.

Ozone water generator 10 according to the present exemplary embodiment is configured in this manner

[2. Operation]

Next, operation and action of ozone water generator 10 according to the present exemplary embodiment will be described with reference to FIGS. 1 to 4.

First, water WA (see FIG. 1) is supplied from inlet port 21 to flow path 12 so that water is supplied to ozone water generator 10. A part of the water supplied to flow path 12 flows into slot 25. Then, the water flowing into slot 25 comes in contact with interface 23 and interface 24 of slot 25.

In the above state (state where electrolytic part 13 is immersed in the supplied water), a voltage is applied between anode 14 and cathode 15 of electrolytic part 13 by a power supply (not illustrated). At this time, a potential difference is generated between anode 14 and cathode 15 via conductive membrane 16. Then, due to the potential difference generated between anode 14 and cathode 15, anode 14, conductive membrane 16, and cathode 15 are energized, and an electrolytic treatment is performed mainly in the water in slot 25. This treatment causes ozone to be generated in the vicinity of interface 23 between conductive membrane 16 and anode 14.

The generated ozone is dissolved in water while being carried to the downstream side of flow path 12 along the flow of water. Then, dissolved ozone water (ozone water or electrolytic liquid) is generated by dissolving ozone in water.

Ozone water generator 10 described above can be therefore applied to an electric device using the electrolytic liquid generated by an electrolytic liquid generation device, a liquid reforming device including an electrolytic liquid generation device, and the like.

Examples of the electric device and the liquid reforming device include water treatment devices such as water purification devices, washing machines, dishwashers, bidet toilet seats, refrigerators, hot water supply/water supply devices, sterilizers, medical equipment, air conditioning devices, and kitchen equipment.

Here, in the present exemplary embodiment, as described below, it is possible to inhibit scale generated by the electrolysis of water from compressing peripheral wall 32 of electrode case 27 of housing 11 and electrolytic part 13.

Specifically, space S is formed between the outer periphery of at least either one of cathode 15 and anode 14 constituting adjacent electrodes and inner surface 32a of peripheral wall 32 (inner surface of housing 11). Space S thus formed inhibits water from staying around electrolytic part 13. That is, space S for allowing water to flow is purposely provided between the periphery of electrolytic part 13 and peripheral wall 32 (housing 11). This can inhibit water from staying around electrolytic part 13. Space S is formed with a gap equal to or larger than the manufacturing tolerance generated when ozone water generator 10 is assembled. Space S is thus provided with reliability, allowing water to flow without staying. This can inhibit scale from accumulating with increased reliability.

That is, in the present exemplary embodiment, as illustrated in FIG. 3, a gap equal to or larger than the manufacturing tolerance is provided between outer periphery 15a (side surface) of cathode 15 and inner surface 32a of peripheral wall 32 (inner surface of housing 11). That is, space S has cathode-side space S1 (first space) formed between outer periphery 15a (side surface) of cathode 15 and inner surface 32a of peripheral wall 32 (inner surface of housing 11).

In the present exemplary embodiment, as described above, the dimension of anode 14, conductive membrane 16, and power feeder 44 in width direction Y (width W1 in the direction crossing liquid flowing direction X) is smaller than the dimension of cathode hole 15d in width direction Y (width W2 in the direction crossing liquid flowing direction X) (see FIGS. 3 and 4). This causes space S to be formed between inner surface 32a of peripheral wall 32 and outer periphery 14a (side surface) of anode 14 when stacked body 17 is accommodated in recess 26 of electrode case 27. Space S is also formed below outer periphery 15a (side surface) of cathode 15.

That is, in the present exemplary embodiment, space S includes anode-side space S2 (second space) formed between outer periphery 14a (side surface) of anode 14 and inner surface 32a of peripheral wall 32 (inner surface of housing 11). Space S also includes lower space S3 (third space) formed below outer periphery 14a (side surface) of anode 14 and between outer periphery 44a (side surface) of power feeder 44 and inner surface 32a of peripheral wall 32 (inner surface of housing 11).

As described above, the present exemplary embodiment has space S including cathode-side space S1 (first space), anode-side space S2 (second space), and lower space S3 (third space) formed between outer periphery 17a (side surface) of stacked body 17 and inner surface 32a of peripheral wall 32.

In the present exemplary embodiment, space S is formed at least around stacked body 17 in the longitudinal direction. That is, at least a part of space S is formed along outer periphery 17a (see FIG. 4) disposed on both sides in width direction Y of stacked body 17 and extending in the longitudinal direction (liquid flowing direction X).

It is preferable that space S be configured to communicate with inlet port 21 and outlet port 22 of electrode case 27 to allow water introduced into space S to efficiently flow out from outlet port 22. Space S may also be configured to communicate with the middle of flow path 12 on cathode side. Specifically, it may be configured to communicate with flow path 12 from anode-side space S2 illustrated in FIG. 3 through cathode hole 15d of slot 25.

That is, by the formation of space S, scale composed of a calcium component and the like generated by electrolysis of water is inhibited from staying and accumulating between stacked body 17 and peripheral wall 32.

For example, the vicinity of interface 24 between conductive membrane 16 and cathode 15 is a site where the pH value is likely to increase, and scale is likely to be generated. However, a relatively large space is formed in the vicinity of interface 24 by the formation of space S described in the present exemplary embodiment. That is, in interface 24 on the outer side in width direction Y, a space (lower space S3) having a predetermined size is formed on anode 14 side (lower side) in stacking direction Z. In addition, interface 24 is exposed to space S in a state where a space (anode-side space S2) having a predetermined size is formed on the outer side in width direction Y.

Further, in the present exemplary embodiment, interface 24 on the outer side in width direction Y is exposed to space S along the longitudinal direction (liquid flowing direction X), and substantially entire (including the entire) interface 24 on the outer side in width direction Y is exposed to space S.

The water introduced into space S thus flows downstream along liquid flowing direction X. That is, the water introduced to the vicinity of interface 24 exposed to space S also flows downstream relatively quickly along liquid flowing direction X. Thus, even when scale is generated in the vicinity of interface 24, the generated scale can flow downstream before fixing to stacked body 17 or housing 11. That is, by the formation of space S, water is inhibited from staying in the vicinity of interface 24 where scale is likely to be generated. Further, the scale generated in the vicinity of interface 24 can quickly flow downstream. The scale can be thus inhibited from staying between stacked body 17 and peripheral wall 32. As a result, it is possible to effectively inhibit compression of peripheral wall 32 (housing 11) or electrolytic part 13 due to accumulation and deposition of the scale.

Although scale is inhibited from staying between stacked body 17 and peripheral wall 32 by space S, the scale may fix to stacked body 17 or peripheral wall 32 in a relatively small amount. When ozone water generator 10 is used for a long period of time for example, scale fixed to stacked body 17 or peripheral wall 32 becomes large and it may compress peripheral wall 32 (housing 11) and electrolytic part 13. Thus, it is preferable that space S be given a size large enough to such an extent that space S is not blocked by the fixed scale even when ozone water generator 10 is used in a period longer than its service life by an ordinary use method. The ordinary use method is determined based on, for example, quality of water (quality of a liquid) supplied into housing 11, an average flow velocity/flow rate of water flowing through housing 11, ozone generation efficiency (voltage applied across the electrodes and an electrolytic area), and an estimated service frequency.

[3. Effects, Etc.]

(1) In the present exemplary embodiment, ozone water generator 10 includes stacked body 17 in which conductive membrane 16 is stacked and interposed between cathode 15 and anode 14 constituting electrodes adjacent to each other, electrolytic part 13 that electrolyzes liquid, and housing 11 in which electrolytic part 13 is disposed. Housing 11 includes inlet port 21 into which a liquid to be supplied to electrolytic part 13 flows, outlet port 22 from which an electrolytic liquid generated in electrolytic part 13 flows out, and flow path 12 in which liquid flowing direction X intersects stacking direction Z of stacked body 17. Electrolytic part 13 includes slot 25 that is open in flow path 12 and formed in such a manner that at least a part of interfaces 23, 24 between conductive membrane 16 and the electrodes is exposed. Width W1 of the outer periphery of either one of the electrodes of cathode 15 and anode 14 is smaller than width W2 of slot 25 (cathode hole 15*d*) of electrolytic part 13.

The above configuration allows ozone generated in the vicinity of interfaces 23, 24 of anode 14 and cathode 15 constituting electrodes to quickly separate from interfaces 23, 24. This can promote dissolution of the generated ozone in water. In addition, the current-carrying areas of anode 14 and cathode 15 can be more stably secured by downsizing anode 14. Thus, the current density of the current flowing through anode 14 and cathode 15 becomes uniform. This enables ozone water generator 10 to achieve a more stable ozone generation ability.

(2) In the present exemplary embodiment, there may be provided space S (cathode-side space S1, anode-side space S2) that is formed between the outer periphery of at least either one electrode of cathode 15 and anode 14 and the inner surface of housing 11 to inhibit liquid from staying.

This configuration allows the ozone generated in the vicinity of interfaces 23, 24 of anode 14 and cathode 15 constituting electrodes to quickly separate from interfaces 23, 24. This can promote dissolution of the generated ozone in water. In addition, the current-carrying areas of anode 14 and cathode 15 can be more stably secured by downsizing anode 14. Thus, the current density of the current flowing through anode 14 and cathode 15 becomes uniform. This enables ozone water generator 10 to achieve a more stable ozone generation ability.

(3) In the present exemplary embodiment, width W1 of outer periphery 16*a* of conductive membrane 16 may be smaller than width W2 of slot 25 (cathode hole 15*d*) of electrolytic part 13.

This configuration allows the ozone generated in the vicinity of interfaces 23, 24 of anode 14 and cathode 15 to quickly separate from interfaces 23, 24 of anode 14 and cathode 15. The generated ozone can be therefore promoted to be dissolved in water. In addition, the current-carrying areas of anode 14 and cathode 15 can be more stably secured by downsizing anode 14. Thus, the current density of the current flowing through anode 14 and cathode 15 becomes uniform. This enables ozone water generator 10 to achieve a more stable ozone generation ability.

(4) In the present exemplary embodiment, slot 25 of electrolytic part 13 may be formed in cathode 15.

This configuration allows the ozone generated in the vicinity of interfaces 23, 24 of anode 14 and cathode 15 to quickly separate from interfaces 23, 24 of anode 14 and cathode 15. This can promote dissolution of the generated ozone in water. In addition, the current-carrying areas of anode 14 and cathode 15 can be more stably secured by downsizing anode 14. Thus, the current density of the current flowing through anode 14 and cathode 15 becomes uniform. This enables ozone water generator 10 to achieve a more stable ozone generation ability.

In this manner, the present exemplary embodiment can provide ozone water generator 10 capable of improving the concentration of ozone dissolved in water.

Other Exemplary Embodiments

Although the preferred exemplary embodiment of the present disclosure has been described above, the present disclosure is not limited to the above exemplary embodiment, and various modifications can be made.

For example, in the above exemplary embodiment, an ozone water generator that generates ozone and dissolves the ozone in water to generate ozone water has been described as an example, but a substance to be generated is not limited to ozone. For example, hypochlorous acid may be generated and used for sterilization, water treatment, and the like. It is also possible to provide a device that generates oxygen water, hydrogen water, chlorine-containing water, hydrogen peroxide water, or the like.

The electrolytic liquid generation device can also be used in a state of being incorporated in another device or equipment. When the electrolytic liquid generation device is incorporated into another device or equipment, similarly to ozone water generator 10, it is preferable to dispose the electrolytic liquid generation device in a standing state such that the inlet port faces downward, and the outlet port faces upward. However, the present invention is not limited to this, and the electrolytic liquid generation device can be appropriately disposed according to the situation.

In the above exemplary embodiment, an example has been described in which the anode is formed of silicon on which a conductive diamond membrane is formed, but the present invention is not limited to this. For example, anode 14 may be formed of conductive silicon, conductive diamond, titanium, platinum, lead oxide, tantalum oxide, or the like. Further, anode 14 may be formed of any material as long as the material is an electrode having conductivity and durability capable of generating electrolyzed water. When anode 14 is a diamond electrode, the method for producing the anode is not limited to the production method by membrane formation described above. In addition, the substrate of anode 14 may be configured using a material other than metal.

In the above exemplary embodiment, cathode 15 made of a titanium electrode plate has been described as an example. However, the present disclosure is not limited to this. Cathode 15 can be used in a useful way as long as it is an electrode having conductivity and durability. Specifically, cathode 15 may be composed of, for example, platinum, titanium, stainless steel, conductive silicon, or the like.

In addition, the specifications (shape, size, layout, etc.) of housing 11, electrolytic part 13, and other details are not limited to the above-described exemplary embodiment and can be appropriately changed as necessary.

Note that, the above-described exemplary embodiment is to exemplify the techniques in the present disclosure, and therefore, various modifications, replacements, additions, omissions, and the like can be made in the scope of the claims or in an equivalent scope thereof.

INDUSTRIAL APPLICABILITY

The present disclosure is applicable to an electrolytic liquid generation device capable of improving the concentration of an electrolytic product dissolved in liquid. Specifically, the present disclosure is applicable to, as an electrolytic liquid generation device, an ozone water generator that generates ozone and dissolves the ozone in water to generate ozone water.

REFERENCE MARKS IN THE DRAWINGS

10: ozone water generator (electrolytic liquid generation device)
11: housing 12: flow path
13: electrolytic part
13a: upper surface
13b: lower surface
14: anode (electrode)
14a, 15a, 16a, 17a, 44a: outer periphery
15: cathode (electrode)
15b, 44b: power feeding shaft
15c, 44c: spring
15d: cathode hole
16b: conductive membrane hole
15e: bent part
16: conductive membrane
17: stacked body
21: inlet port
22: outlet port
23: interface
24: interface
25: slot
26: recess
27: electrode case
28: electrode case lid
31: bottom wall
31a, 32a: inner surface
32: peripheral wall
33: elastic body
34: lid body
35: protrusion
36: fitting recess
37: fitting protrusion
38: flange
41: projection
42: through-bore
43: groove
44: power feeder
45: through-hole
51: O-ring
52: washer
53: washer
54: hex nut
S: space
X: liquid flowing direction
Y: width direction
Z: stacking direction

The invention claimed is:

1. An electrolytic liquid generation device comprising:
an electrolytic part that electrolyzes a liquid, wherein the electrolytic part includes a stacked body in which a conductive membrane is stacked and interposed between a cathode and an anode; and
a housing in which the electrolytic part is disposed, wherein:
the housing includes an inlet port through which the liquid is supplied to the electrolytic part, an outlet port from which an electrolytic liquid generated in the electrolytic part flows out, and a flow path in which a liquid flowing direction intersects a stacking direction of the stacked body,
the electrolytic part includes a slot that is open in the flow path and disposed to cause at least a part of an interface between the conductive membrane and each of the cathode and the anode to be exposed,
the slot includes at least one cathode hole formed so as to penetrate the cathode in the stacking direction and at least one conductive membrane hole formed so as to penetrate the conductive membrane in the stacking direction, a width of an outer periphery of the anode is smaller than a width of the at least one cathode hole,
a width of an outer periphery of the conductive membrane is smaller than a width of the at least one cathode hole,
in a cross-sectional view of the electrolytic liquid generation device taken along a plane orthogonal to the liquid flowing direction, a width of the at least one conductive membrane hole is smaller than a width of the at least one cathode hole,
the electrolytic generation device further comprises a space disposed between the electrolytic part and an inner surface of the housing, the space inhibiting the liquid from staying, and
the space comprises:
a first space formed between a first side surface of the cathode and the inner surface of the housing, the first side surface being orthogonal to a major surface of the cathode on which the anode is stacked; and
a second space, connected to the first space and formed between a second side surface of the anode and the inner surface of the housing, the second side surface being orthogonal to a major surface of the anode on which the cathode is stacked, wherein the second space communicates with the at least one cathode hole.

2. The electrolytic liquid generation device according to claim 1, wherein
in a plan view, the cathode is stacked on the conductive membrane, the width of the outer periphery of the anode is smaller than the width of the at least one cathode hole, and the width of the outer periphery of the conductive membrane is smaller than the width of the at least one cathode hole.

3. The electrolytic liquid generation device according to claim 1, wherein the cathode is selected from the group consisting of platinum, titanium, stainless steel, and conductive silicon.

4. The electrolytic liquid generation device according to claim 1, wherein the at least one cathode hole has a V-shape with an apex of the V-shape pointing toward the outlet port from the inlet port.

5. The electrolytic liquid generation device according to claim 1, wherein the at least one conductive membrane hole has an elongated shape extending in a first direction perpendicular to a second direction connecting the inlet port and the outlet port.

6. An electrolytic liquid generation device comprising:
an electrolytic part that electrolyzes a liquid, wherein the electrolytic part includes a stacked body in which a conductive membrane is stacked and interposed between a cathode and an anode;
a housing in which the electrolytic part is disposed; and
a power supply comprising a negative terminal being electrically connected to the cathode and a positive terminal being electrically connected to the anode, wherein during operation of the electrolytic liquid generation device, electrons flow from the cathode to the anode through the stacked body,
wherein:
the housing includes an inlet port through which the liquid is supplied to the electrolytic part, an outlet port from which an electrolytic liquid generated in the electrolytic part flows out, and a flow path in which a liquid flowing direction intersects a stacking direction of the stacked body,
the electrolytic part includes a slot that is open in the flow path and disposed to cause at least a part of an interface between the conductive membrane and each of the cathode and the anode to be exposed, the slot includes at least one cathode hole formed so as to penetrate the cathode in the stacking direction and at least one conductive membrane hole formed so as to penetrate the conductive membrane in the stacking direction, a width of an outer periphery of the anode is smaller than a width of the at least one cathode hole, a width of an outer periphery of the conductive membrane is smaller than a width of the at least one cathode hole, in a cross-sectional view of the electrolytic liquid generation device taken along a plane orthogonal to the liquid flowing direction, a width of the at least one conductive membrane hole is smaller than a width of the at least one cathode hole, the electrolytic generation device further comprises a space disposed between the electrolytic part and an inner surface of the housing, the space inhibiting the liquid from staying, and the space comprises:

a first space formed between a first side surface of the cathode and an inner surface of the housing, the first side surface being orthogonal to a major surface of the cathode on which the anode is stacked; and a second space, connected to the first space and formed between a second side surface of the anode and the inner surface of the housing, the second side surface being orthogonal to a major surface of the anode on which the cathode is stacked wherein the second space communicates with the at least one cathode hole.

7. The electrolytic liquid generation device according to claim 6, comprising a space disposed between the outer periphery and an inner surface of the housing, the space inhibiting the liquid from staying.

8. The electrolytic liquid generation device according to claim 6, wherein in a plan view, the cathode is stacked on the conductive membrane, the width of the outer periphery of the anode is smaller than the width of the at least one cathode hole, and the width of the outer periphery of the conductive membrane is smaller than the width of the at least one cathode hole.

9. The electrolytic liquid generation device according to claim 6, wherein the cathode is selected from the group consisting of platinum, titanium, stainless steel, and conductive silicon.

10. The electrolytic liquid generation device according to claim 6, wherein the at least one cathode hole has a V-shape with an apex of the V-shape pointing toward the outlet port from the inlet port.

11. The electrolytic liquid generation device according to claim 6, wherein the at least one conductive membrane hole has an elongated shape extending in a first direction perpendicular to a second direction connecting the inlet port and the outlet port.

\*　\*　\*　\*　\*